June 8, 1965  J. DE MAIO  3,187,761
PORTABLE WIND SCREEN
Filed Feb. 5, 1963

INVENTOR.
JAMES DeMAIO
BY
Browne, Schuyler, and Beveridge
ATTORNEYS.

United States Patent Office 3,187,761
Patented June 8, 1965

3,187,761
PORTABLE WIND SCREEN
James De Maio, Antlers Trailer Park, Pleasantville, N.J.
Filed Feb. 5, 1963, Ser. No. 256,364
6 Claims. (Cl. 135—5)

This invention relates to wind screens and more particularly to a portable wind screen which may be used on the beach or in a similar area as a shelter against the elements and which may be easily collapsed for storage and transportation.

While some forms of wind screens may be found in the prior art, those which have been proposed have had several inherent disadvantages which made their use inconvenient. Oftentimes the screens were portable in the sense that they could be collapsed, but the structure of the screens and their containers was such that the work involved in setting up and taking down the screens was complicated and time consuming. Moreover, the supporting elements for the screen either were separately attached, which created a danger of loss, or, when they were a unitary part of the screen, protruded from the container to create a safety hazard. These and several other disadvantages have been overcome by the present invention, which has resulted in a truly portable wind screen.

It is therefore an object of this invention to provide a portable wind screen which is easy to set up and take down.

It is another object of this invention to provide a portable wind screen which collapses into a compact structure which encloses otherwise dangerously protruding supporting elements.

It is another object of this invention to provide a portable wind screen wherein the screen may be set up by placing a storage container on the ground, operating a handle to drive supporting stakes into the ground, extending the screen from the container, and operating another handle to maintain the screen in its extended and upright position.

The foregoing and other objects of the invention are accomplished by a novel arrangement of parts in which a flexible wind screen is wound on a roller and mounted inside a hollow elongate container. When the screen is to be set up a pair of linearly movable stakes enclosed by the container are moved by an operating handle through the bottom of the container into the ground, establishing the container as a support and anchor for one end of the screen. The screen is then unwound from the roller and extended the desired distance whereupon a stake mounted on the free end of the screen is driven into the ground to anchor and support it.

Other objects, features and advantages of the present invention will become more apparent from the following detailed description taken in conjunction with the attached drawings in which.

Figure 1:
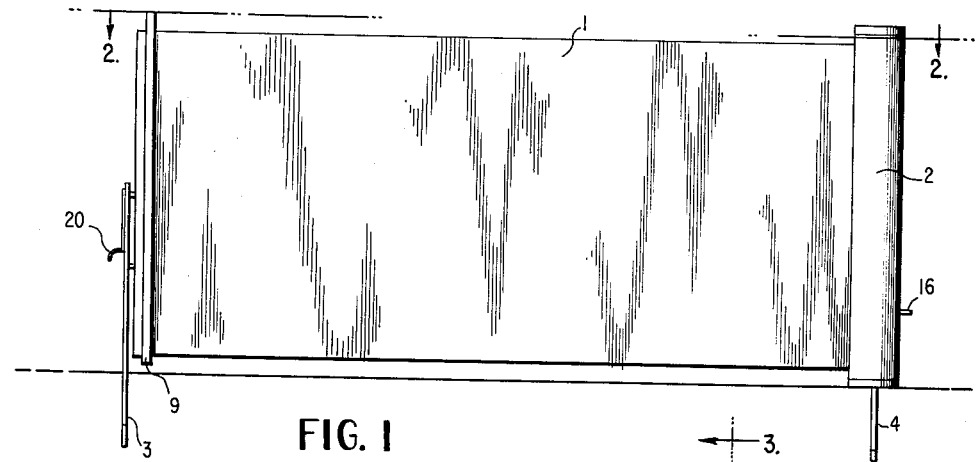
FIG. 1 is a front view of the portable wind screen in its extended position.
Figure 2:
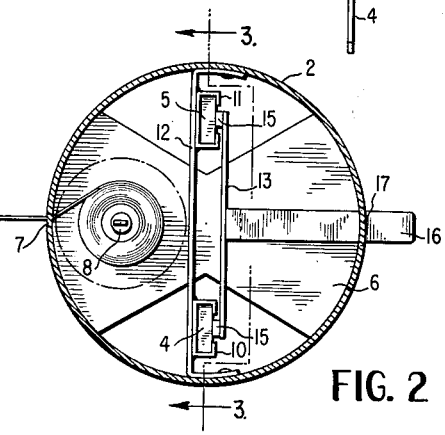
FIG. 2 is a top view of the portable wind screen in its partially extended position taken in partial section along the lines 2—2 of FIG. 1.

Referring now to FIGS. 1 and 2, the wind screen is shown in its open position in which a screen 1 extends from a hollow elongate storage container 2 and is anchored at its ends by extendable stakes 3, 4 and 5.

Storage container 2 is a substantially tubular member of a relatively rigid material, such as metal, having a top plate (not shown) and a bottom plate 6. While container 2 is shown as having a circular cross-section, it should be apparent that the cross-sectional configuration may be varied within wide limits without departing from the invention.

Screen 1, which may be of any flexible wind resistant material such as canvas, nylon or light gauge metal, extends through a longitudinal slot 7 in container 2 and is attached to and wound on a rotatable support member 8. Support member 8 is preferably of the window shade roller type in which the energy for rewinding the screen is provided by the act of unwinding. At its opposite end, screen 1 is attached to a rigid support member 9 which keeps the end of screen 1 from flopping over and which also serves as a mounting element for stake 3.

Stakes 3, 4 and 5 serve to anchor the wind screen in its open position and are so arranged as to be withdrawn to a sheathed position when the wind screen is collapsed. Moreover, stakes 3, 4 and 5 are mounted so that they may be driven into the ground quickly and conveniently.

Figure 3:
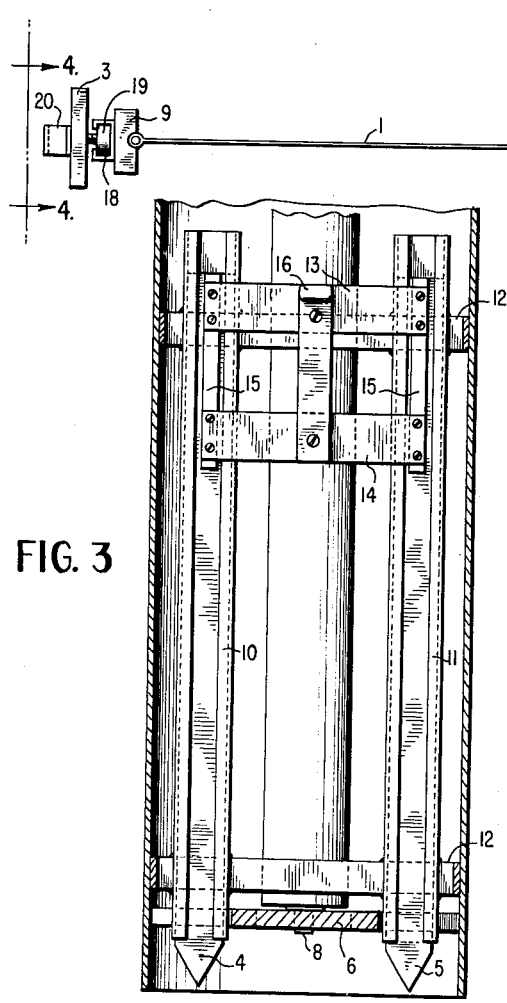
FIG. 3 is a fragmentary sectional view of the storage container taken along the lines 3—3 of FIG. 2.

Referring now to FIGS. 2 and 3, extendable stakes 4 and 5 are slidably mounted between the walls of track members 10 and 11 for linear movement through openings in bottom plate 6. Tracks 10 and 11 are supported within container 2 by bars 12 which extend across and are attached to its inner walls. A pair of connecting members 13 and 14 extend between and are attached to stakes 4 and 5 so that they will be moved simultaneously. Spacing strips 15 attached to stakes 4 and 5 project beyond the walls of track members 10 and 11 to provide clearance for connecting members 13 and 14. An operating handle 16 extends through a longitudinal slot 17 of container 2 and is attached to connecting members 13 and 14. By moving handle 16 up and down, stakes 4 and 5 may be driven into the ground or retracted. The length of slot 17 and of tracks 10 and 11 are chosen so that when stakes 4 and 5 are in their fully retracted position their points will not project beyond the lower end of container 2.

Figure 4:
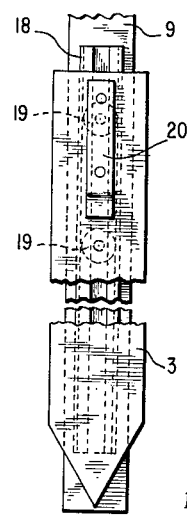
FIG. 4 is a fragmentary end view of the portable wind screen as viewed along line 4—4 of FIG. 2.

A similar arrangement is provided at the remote or free end of screen 1 wherein a track member 18 similar in configuration to members 10 and 11, i.e., having a base and projecting walls defining tracks, is attached to rigid support members 9 (see FIG. 4). Extendable stake 3 is mounted for linear movement along track member 18 by a pair of spaced bearings 19 which slide between the walls of track member 18. An operating handle 20 is attached to stake 3 for driving it into the ground and retracting it. When stake 3 is in its retracted position, its point is shielded by the lower end of support member 19. It should also be pointed out that handles 16 and 20 may be either hand or foot operated.

It should be apparent, therefore, that I have provided a portable wind screen which is easy to set up and yet which collapses into a compact structure which is truly portable. When the wind screen is collapsed, rigid support member 9 fits snugly against the wall of container 2 and the points of stakes 3, 4 and 5 are fully withdrawn. If desired a carrying handle may be provided on container 2 to further enhance its portability.

While I have described and illustrated a preferred embodiment of my invention, I wish to be understood that I do not intend to be restricted solely thereto, but that I do intend to cover all modifications which would be apparent to one skilled in the art, and which come within the spirit and scope of my invention.

What I claim is:
1. A portable wind screen comprising
    a hollow elongate storage container;
    linearly movable stakes sliably mounted inside said container and extendable through the bottom thereof, said stakes in their extended position serving as supports to anchor said container in a vertical position;

means guiding said stakes for movement from within said container to an extended position partially outside said container;

a first longitudinal slot in a wall of said container;

means extending through said first slot and engaging said stakes for moving said stakes to their extended position;

a rotatable screen support member mounted inside said container;

a second longitudinal slot in a wall of said container;

a flexible, wind resistant screen extending through said second slot and having one end attached to said rotatable support member whereby said screen may be wound on said rotatable support member for storage in said container;

a fixed screen support member attached to the end of said screen remote from said rotatable support member;

a linearly movable stake mounted on said fixed support member, said stake in its extended position serving as a support to anchor said remote end of said screen at a distance from said container; and means attached to said stake for moving it to its extended position.

2. A portable wind screen comprising a hollow elongate storage container;

a pair of track members rigidly mounted inside said container;

a pair of stakes each slidably mounted on one of said track members and linearly movable through an opening in the bottom of said container to anchor said container in a vertical position;

a connecting member extending between and attached to said stakes;

a handle extending through a first longitudinal slot in a wall of said container and attached to said connecting member for moving said stakes to anchor said container;

a rotatable screen support member mounted inside said container;

a second longitudinal slot in a wall of said container;

a flexible wind resistant screen extending through said second slot and attached at its one end to said rotatable support member whereby said screen may be wound on said rotatable support member for storage in said container; and means attached to the opposite end of said screen for anchoring said opposite end of said screen at a distance from said container.

3. A portable wind screen according to claim 2 wherein said means for anchoring said opposite end of said screen comprises a fixed screen support member attached to said opposite end of said screen;

a track mounted on said fixed support member;

and a stake mounted on said track for linear movement in a plane defined by said screen.

4. A portable wind screen according to claim 3 wherein said means for anchoring said opposite end of said screen includes a handle attached to said stake for moving said stake.

5. A portable wind screen comprising a hollow elongate storage container;

a pair of members rigidly mounted in said container, each member having oppositely disposed walls defining tracks;

a pair of linearly movable stakes, each stake positioned between said walls of one of said members for slidable movement on said tracks along a line extending through the bottom of said container, said stakes when moved through said bottom serving to anchor said container in a vertical position;

a connecting bar extending between and attached to said stakes to move said stakes in unison;

a first longitudinal slot in a wall of said container;

an operating handle extending through said slot and attached to said connecting bar for moving said stakes through said bottom;

a rotatable screen support member mounted inside said container;

a second longitudinal slot in a wall of said container;

a flexible wind resistant screen extending through said second slot and attached at its one end to said rotatable support member whereby said screen may be wound on said rotatable support member for storage in said container; and means attached to the end of said screen remote from said container for anchoring said remote end at a distance from said container.

6. A portable wind screen according to claim 5 wherein said means for anchoring said remote end comprises a rigid support member attached to said remote end of said screen and extending along at least a portion thereof;

a pair of tracks attached to said rigid support member;

a pair of bearings slidably mounted between said tracks;

a stake attached to and spacing said bearings; and means attached to said stake for moving said stake and said bearings along a line defined by said pair of tracks.

References Cited by the Examiner
UNITED STATES PATENTS

| | | | |
|---|---|---|---|
| 809,516 | 1/06 | Mann | 135—15 |
| 1,555,207 | 9/25 | Hojo | 248—85 |
| 1,749,302 | 3/30 | Rasmusen | 248—88 |
| 2,633,317 | 3/53 | Marsh | 248—96 |
| 2,771,088 | 11/56 | Soldan | 135—5 |
| 3,045,788 | 7/62 | Cederholm | 248—156 |

HARRISON R. MOSELEY, *Primary Examiner.*